Jan. 5, 1954 W. I. E. KAMM 2,665,137
METHOD FOR STABILIZING VEHICLES
Filed May 13, 1949 2 Sheets-Sheet 1
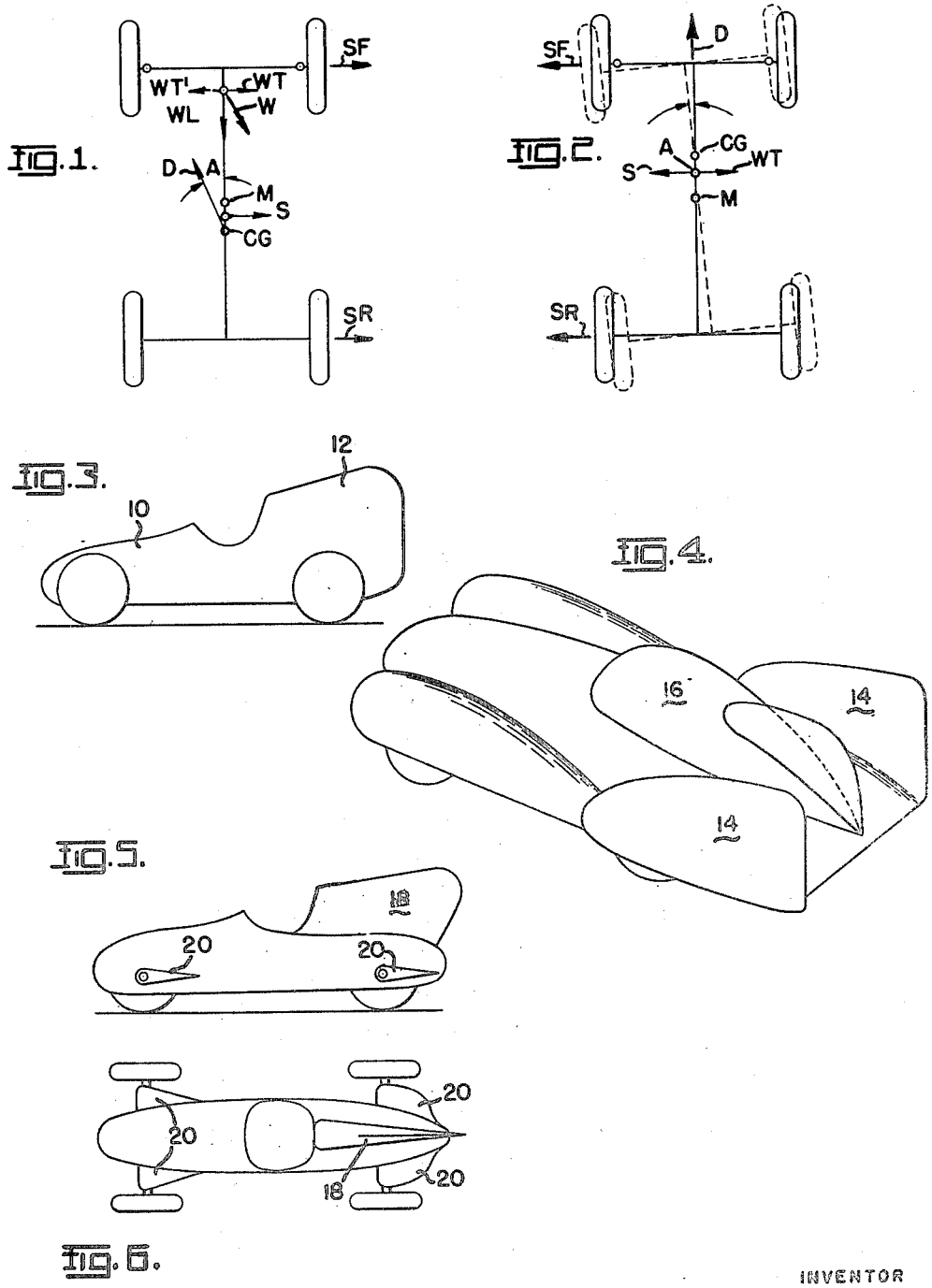
INVENTOR
WUNIBALD IRMIN ERICH KAMM
BY
ATTORNEYS

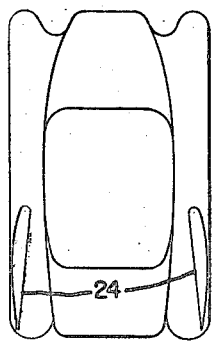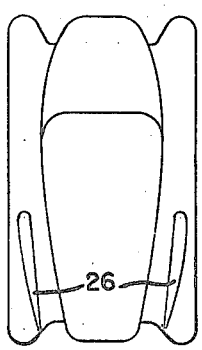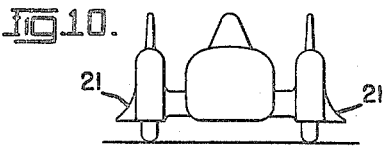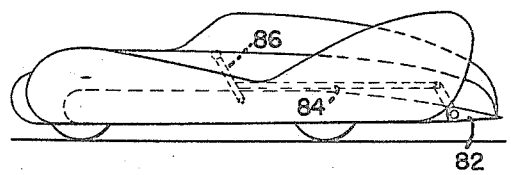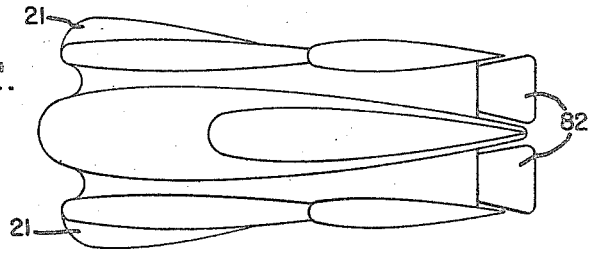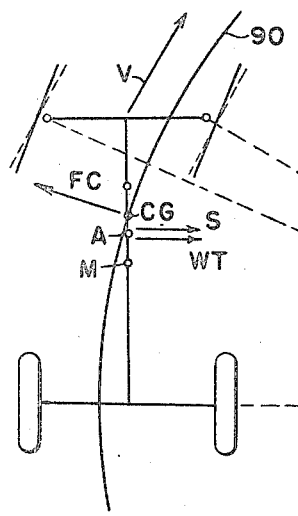

Patented Jan. 5, 1954

2,665,137

UNITED STATES PATENT OFFICE 2,665,137

METHOD FOR STABILIZING VEHICLES

Wunibald I. E. Kamm, Dayton, Ohio, assignor to Automotive Design Company, Dayton, Ohio, a corporation of Ohio Application May 13, 1949, Serial No. 93,157

2 Claims. (Cl. 280—1)

This application relates to the stabilization of vehicles, and particularly to methods for stabilizing the operation of automotive vehicles, such as passenger cars.

At the present time, a great many people are killed or injured every year due to automobile accidents, and the majority of these accidents involve passenger vehicles. It is believed that a great many of these accidents are caused by the instability of the vehicles which imparts to them a strong tendency to spin or skid whenever they are deflected from their course by a predetermined amount.

Deflections of this nature are continuously occurring during driving and can be caused by sudden cross winds, by a wheel of the vehicle striking a stone or other obstruction in the road, such as a rut or ridge, by the vehicle striking or being struck by another vehicle, or some other object, or by a sudden shifting of the load within the vehicle. In general, it can be said that the lighter the vehicle is, and the faster it is being driven, the larger the deflecting force on the vehicle will be for any of the abovementioned stimuli. Also, the faster the vehicle is moving, the more quickly the vehicle operator must react in order to restore it to stable operating conditions.

Inasmuch as recent tendencies in the manufacture of motor vehicles have been to make them lighter and more powerful than before, whereby they can be driven more rapidly, and the tendency is for highways to be more and more adapted to high speed operation, it will be apparent that the seriousness of the problem of reducing automobile accidents is continuously increasing.

The primary object of the present invention is to provide a method for stabilizing automotive vehicles so that they do not tend to spin or skid when subjected to deflecting influences during operation.

Another object of this invention is to provide a method for making an automotive vehicle stable in that it will hold its driving direction without specific quick reactions of the vehicle driver to deflecting disturbances acting on the vehicle.

A particular object of this invention is to provide a method for utilizing the air flow past an automotive vehicle for exerting guidance forces thereon to render the vehicle stable in operation.

Another particular object of the present invention is the provision of a method for making automotive vehicles, such as passenger cars, stable with respect to rotation about a vertical axis relative to all disturbing influences acting thereon.

These and other objects and advantages will become more apparent upon reference to the following description taken in connection with the accompanying drawings, in which:

Figure 1 is a diagrammatic view of a known type of automotive vehicle showing the thrusts acting thereon during operation;

Figure 2 is a corresponding layout of a vehicle embodying the teachings of this invention;

Figure 3 is a side elevational view of one manner of constructing a vehicle so as to utilize a portion of the teachings of this invention;

Figure 4 is a perspective view of still another form which a vehicle according to this invention may take.

Figure 5 shows a side view and Figure 6 a plan view of still another form of vehicle construction according to this invention;

Figure 7 is a plan view of a vehicle showing guiding fins on opposite sides of the vehicle body and which fins are divergent toward the rear of the vehicle;

Figure 8 is a view similar to Figure 7 but showing corresponding fins which are convergent toward the rear of the vehicle;

Figure 9 is a view showing how the fins of Figures 7 and 8 can be formed of parts and may be arranged in a straight line or in a staggered pattern as shown.

Figure 10 is a front view of a vehicle having guiding fins thereon and also having air foil extending outwardly from the fenders for the purpose of adding stability to the vehicle;

Figure 11 is a view of an arrangement somewhat like that shown in Figure 10 but looking at the side of the vehicle, and showing how auxiliary air foil sections can be mounted so as to be adjustable from within the vehicle to accommodate for shifting of loads therein;

Figure 12 is a plan view looking down on the arrangement shown in Figure 11; and Figure 13 is a diagrammatic view showing a vehicle constructed according to this invention being driven about a curve and illustrating the thrusts acting on said vehicle.

Referring first to Figure 1, this view shows the forces and moments acting on a known type vehicle when it is in operation. Figure 1 shows such vehicle in the position it would occupy after a minor disturbance has acted thereon and deflected it somewhat from the course it has been following. The center of gravity of the vehicle is indicated at CG, and the direction of movement that the vehicle has is indicated by the arrow D which extends forwardly and leftwardly from point CG. The angle which arrow D makes with the longitudinal axis of the car is indicated at A, and may be referred to as the angle of disturbance.

An essential part of the running resistance of such vehicle, whenever the speed thereof approaches that normally encountered in highway travel, is air drag, or windage. The thrust of the windage of the vehicle is indicated by the arrow W, and this is indicated as broken down into the transverse force WT and the longitudinal force WL.

In such known type vehicle the center of impact of air or wind on a vehicle is well to the front of the center of the vehicle, and it is so indicated in Figure 1. It will be understood that the exact point through which the effective resultant of the windage or air drag acts will vary considerably, but in all such vehicles at the present time, this point is, as indicated, well forward of the center of the vehicle.

It will be observed that the component WT of the air drag or windage W has a substantial moment arm about the center of gravity CG of the vehicle, and thus, has a tendency to rotate the vehicle clockwise about a vertical axis.

Due to the fact that the vehicle is moving at an angle to the direction of its longitudinal axis, there are side thrusts acting on the front and rear wheels which are indicated at SF and SR, respectively. These forces, which may be referred to as guidance forces, represent the resistance of the front and rear wheels to slipping transversely across the surface on which they rest due to the direction of travel of the vehicle.

The forces are not, as might be expected, proportional to the loading on the front and rear wheels, but vary relative to the said loading in a nonlinear relationship, such that said forces increase less rapidly than the loading on the wheels, equal tire pressures presumed; with softer tires these forces decrease. Accordingly, at higher loaded or softer tires, i. e., with greater tire deformation at the rear axle, the force SR even if it is greater than the force SF, will not be greater by the same ratio as the ratio of wheel loading.

If, with equal tire pressure, a linear relationship existed between the loading of the front and rear wheels and the forces SF and SR, the resultant of these forces would act through the center of gravity, but due to the aforementioned nonlinear characteristics of this ratio, the resultant of these forces, indicated at S, acts forwardly of the center of gravity, and thus has a moment arm thereabout tending to rotate the vehicle clockwise about a vertical axis.

It will be understood that in addition to the laterally acting guidance forces SF and SR on the front and rear wheels, there is a certain amount of rolling resistance of the wheels which act in the direction of the planes of the wheels. The rolling resistance, however, is insignificant in size.

It will be noted that the thrusts acting on the vehicle in Figure 1, that is, the momentum of the vehicle which acts through the center of gravity in the direction D, the impact of the air on the vehicle, and the resistance of the front and rear wheels to side slipping, all tend to rotate the vehicle about a vertical axis. The vehicle is, accordingly, unstable and is in a condition of spin or impending spin at this time.

If the air flow force acting on the vehicle is directed to the opposite side, as shown, then the lateral thrust which it exerts on the vehicle is represented by the dashed arrow marked WT'. In this case, it tends to counteract the lateral force S due to the wheels and to decrease the angle of disturbance A. This angle, if the air thrust is sufficiently large, will, therefore, decrease and pass through zero, and the inclination of the car commences to increase in the opposite direction. The vehicle is, accordingly, still unstable even under these conditions.

Even if the air flow struck the vehicle in such a direction that it acted only longitudinally on the vehicle, a disturbance acting on the vehicle tending to swerve it from its course, would immediately set up a lateral air flow force component tending to make the vehicle unstable. It will be evident that any disturbance acting on the vehicle shown in Figure 1 immediately throws it into an unstable, and, therefore, unsafe condition.

Even, if by decreasing the loading or increasing the inflation of the rear tires, the moment of force S would counteract that of force WT, the latter will by all means, be greater on known cars, thus forcing the vehicle out of its driving direction.

It has been attempted to give a vehicle stability by the toe-in imparted to the front wheels, but this is successful to a limited degree only. This is due to the fact that the amount of toe-in which can be given the front wheels of a vehicle is limited by the amount of tolerable tire wear and is so small that any essential disturbance of the vehicle carries it outside the range within which toe-in is effective for imparting stable operation to the vehicle. It may be mentioned that vehicles have been built in which the center of gravity is located in front of the mid-point M. In such an instance, the moment of the lateral air force WT, and the moment of the guiding force S, act in opposite directions with regard to each other. However, with the conventional shape and construction of some present day vehicles, the moment arm of the force WT is materially greater than that of force S. Consequently, the lack of stability above referred to will still prevail with such vehicles, even if their center of gravity is located in front of the mid-point.

Figure 2 diagrammatically illustrates a vehicle arrangement according to this invention which effects automatically stabilization over a relatively wide range of disturbances. The vehicle constructed according to Figure 2 is practically free of the tendency to sideslip or spin. It will maintain a given direction without any substantial steering corrections, and even if braked to a point where the wheels slip, it will slide in the direction in which it is moving without swerving or spinning.

The stabilization referred to above is accomplished by adjustment of the several factors described which tend to cause the vehicle to swerve, spin or skid.

The point of attack of the air flow force in the vehicle is positioned rearwardly of the center of gravity and is indicated in Figure 2 by the arrow WT which indicates the lateral thrust of the air flow force on the vehicle. The point A through which the resultant of the guidance forces SF on the front wheels and SR on the rear wheels acts, is shown in Figure 2 where the center of gravity CG is in front of the midpoint M, as coinciding with the point of attack of the air flow force. The two points referred to are not necessarily common and may be located at different points along the longitudinal axis of the vehicle so long as both are behind the center of gravity indicated at CG. To demonstrate the manner in which the above described changes impart stability to the vehicle, let it be considered that the vehicle is originally moving without a lateral wind force and is proceeding in the direction of arrow D in Figure 2, and that then it is being acted on by the transverse air flow WT directed as shown. The result of the air flow force WT is to cause the vehicle to turn around its center of gravity CG to its dotted line position in Figure 2 while it continues in the direction D.

Under these circumstances, it will be noted that there are lateral guidance forces SF and SR acting on the front and rear wheels, respectively, and directed leftwardly, and the resultant of which is indicated at S acting leftwardly through point A. It will be evident that the vehicle will come to a stabilized or balanced condition depending on the size of the air flow force merely by the vehicle turning to that angle where the moment from the lateral guidance forces counterbalance the effect of the air flow force. If the air flow force disappears, then the oblique position of the vehicle also disappears, and if the air flow force is directed toward the vehicle from the opposite direction, then the oblique position of the car will be opposite to that shown.

When the operation of the vehicle is accompanied by other disturbances, such as those arising from irregularities in the road, the increased oblique angle at which the vehicle is running decreases according to the effect the additional disturbance has on the lateral guidance forces, and the vehicle is thereby brought back into a condition of equilibrium.

The above mentioned angular movements of the vehicle and lateral displacements of its front and rear ends remain relatively small because the reactions set up thereby take effect immediately The vehicle is, therefore, unstable only very briefly, and after any disturbance immediately returns to a condition of stable equilibrium. This means that the direction of movement of the center of gravity is substantially unchanged, unless some change is made in the vehicle steering. The greatest degree of stability is obtained when the air flow force acts at the same point as the resultant of the guidance forces on the front and rear wheels.

However, due to changes in the loading of the vehicle under different conditions, the center of gravity will shift and the point A where the resultant of the guidance forces acts will also shift for the same reason, and a condition of maximum degree of stability, as illustrated in Figure 2, cannot be maintained at all times. However, the changes in stability of the vehicle due to the shifting of the center of gravity and variations in the loading on the wheel axle or changes in tire pressure are quite small, and their effect is generally unnoticed by the vehicle driver.

From the foregoing, it will be seen that the desired stability in a vehicle is obtained by locating the position of the center of gravity, the point of attack of the air flow force, and the point through which the resultant of the guidance forces on the wheels acts between the wheels of the vehicle in the proper relationship to each other. I have found it to be satisfactory to determine these several factors by the use of scale models of the vehicles placed in wind tunnels. These models may be placed on endless belts, and the lateral forces and moments acting thereon determined in the same manner as the forces acting on an airplane model are determined in a wind tunnel. By arranging the endless belt so that it can be turned to oblique positions relative to the air stream, actual conditions of road travel can be substantially duplicated.

One manner of shifting the point of attack of the air flow force is illustrated in Figure 3, wherein the vehicle is arranged to have a relatively small impact area forwardly of the center, indicated at 10, and a relatively large area behind the center, as indicated at 12. Preferably, the portion of the vehicle at 12 is as flat as possible, or, at least the increase thereof, so as not to present too great a transverse area which would materially increase the longitudinal component of the air flow force.

Another manner of rearwardly shifting the point of attack is illustrated in Figure 4, wherein the rear fenders 14 of the vehicle are formed so as to be upstanding and thus to have a fin-like effect. Additionally, the passenger compartment may be formed as at 16 so as to have a substantial area upstanding rearwardly of the center of the car and cooperating with the upstanding fenders 14 to provide for a large impact area rearwardly of the vehicle center.

In Figures 5 and 6, the portion of the body immediately behind the driver's seat is enlarged as much as necessary to form an effective guide surface. This guide surface is indicated at 18, and it will be evident that it provides a large impact area rearwardly of the center of the vehicle. These views also illustrate the use of fairings or air foils 20 between the wheels and the body of the vehicle. These fairings are useful in maintaining the proper wheel loadings while the vehicle is moving, as will become apparent hereinafter.

It may be noted that Figure 4 shows a plurality of fins or guide surfaces, and that, therefore, each of the said fins or surfaces can be somewhat smaller than the fins shown in Figures 3 and 5 and which are unitary.

A fin in an air stream directed longitudinally thereof does not develop any appreciable lateral thrust until it is moved to a substantial oblique angle relative to the direction of travel of the air stream. If the air fins are employed in connection with a vehicle having the front wheels toed-in, then the said fins may extend parallel with the longitudinal axis of the vehicle and satisfactory stabilizing results therefrom will obtain because the amount of angular movement required of the vehicle to make the fins effective does not exceed that range over which the toed-in front wheels impart stability. However, inasmuch as it is preferable to eliminate toe-in from the front wheels if possible, in order to reduce tire wear, the said fins are preferably attached to the vehicle at a slight angle to the axis of the vehicle.

In this manner the guidance fins are not only immediately effective as soon as the vehicle assumes an angle relative to its direction of travel, but a certain compensating moment is exerted on the vehicle due to a decrease in effectiveness of one fin and an accompanying increase in effectiveness of the other as the vehicle turns relative to its direction of travel.

Two arrangements embodying this type of fin arrangement are shown in Figures 7 and 8. In Figure 7, the fins, indicated at 24, and upstanding from the rear fenders of the vehicle, are shown as diverging toward the rear, whereas, in Figure 8, the corresponding fin members 26, and also upstanding from the rear fenders of the vehicle, are shown as converging toward the rear. It will be understood that the body forms, especially between the fins, are such that the air flow over the fins is not disturbed and has little or no tendency to separate therefrom.

It may be preferable in some cases to form the fins in parts, as shown in Figure 9, wherein a fin arrangement is shown comprising the individual portions indicated at 28 and so arranged that they have the same effect as a group as one large fin whose effective axis is parallel to the individual axes of the said parts. A fin of this nature is more effective at the lower speeds of the vehicle and provides means for imparting stability to the car even at the lowest speeds at which such stability is desirable.

It has been mentioned previously that the location of the resultant of the guidance forces on the front and rear wheels is important for maintaining the proper degree of stabilization. It has also been mentioned that these guidance forces are influenced by axle loading. Accordingly, it may be preferable in certain instances to provide means for adjusting the axle loadings of the vehicle in order to compensate for shifting loads within the vehicle and thereby to maintain the desired degree of stability.

The preferred manner of adjusting the axle loads is to provide fairings or air foils around the axles, as shown at 20 in Figure 5. These air foils may also be positioned at the rear end of the body, as shown at 82 in Figures 11 and 12. As shown in Figure 11, the fins or air foils 82 are connected by a linkage 84 with a lever 86 positioned within the passenger compartment of the vehicle so that the vehicle operator can adjust the air foils 82 at will. In this manner the loadings on the front and rear axles can be controlled and therethrough the guidance forces on the wheels and the location of the resultant thereof.

Another form which these elements may take is shown at 21 in Figures 10, and 12, wherein the sides of the front fenders are formed outwardly so as to provide laterally extending air foils for reacting with the air flowing longitudinally over the vehicle.

The operation of a stabilized vehicle according to this invention negotiating a curve is diagrammatically illustrated in Figure 13. In Figure 13 the vehicle is traveling along a line indicated at 90 which is an arc about a point 92. The vehicle is acted on by a centrifugal force indicated at FC, acting radially outwardly through the center of gravity CG, and causing the center of gravity to deviate from line 90 to the left, by guidance force S directed rightwardly through point A and by a transverse air flow force WT also acting rightwardly through point A.

It will be evident that the forces shown create a moment on the vehicle tending to turn it counterclockwise. To offset this moment and to bring the car to a condition of stable equilibrium, the force S is shifted toward the front axle of the vehicle by a steering correction that consists of turning the front wheels inwardly. If the vehicle were of the unstable type, as shown in Figure 1, the moment on the vehicle set up by the air flow force, the centrifugal force, and the lateral guidance force would tend to rotate the vehicle clockwise, and to counteract this, the lateral guidance force would be shifted rearwardly toward the rear axle by a steering correction consisting of turning the front wheels inwardly but to a substantially smaller angle than in the case of the stable vehicle.

It will be apparent, therefore, that a stable vehicle negotiating a curve has its front wheels turned to a greater degree than an unstable vehicle. Further, should an unstable vehicle commence to skid, it will spin in a manner which will throw the rear wheels outwardly and set up sliding of the vehicle sideways. However, should a stable vehicle commence to skid, it will have a tendency to leave the curve which it is negotiating on a tangent, heading substantially forward. It will be appreciated that the latter condition is much to be preferred over the former.

Further stability can be imparted to either a stable or an unstable vehicle by utilizing a front wheel drive. In the case of the vehicle shown in Figure 13, a front wheel drive arrangement would set up a thrust on the front wheels indicated by the arrow V. This arrow, of course, would have a component longitudinally of the car and one transversely of the car, and which transverse thrust would increase the centripetal force tending to hold the vehicle on its course. Also, inasmuch as the steered wheels on a stable vehicle are turned to a greater degree than those on an unstable vehicle would be, this component is materially greater for a stable vehicle.

This effect, combined with the stabilizing influence of the air flow force, permits a stable vehicle to negotiate a curve much more safely than an unstable vehicle, and at a considerably faster rate, if necessary.

The differences between known vehicles and vehicles embodying the principles of this invention may be summarized as follows:

Known vehicles are unstable with regard to maintaining driving direction. When traveling in a straight line, they are capable of holding driving direction without steering correction only over a very small range of deviations by means of toe-in and under favorable road and wind conditions. If the vehicle encounters a disturbance which deflects it beyond the aforementioned limited range, the vehicle has a tendency to skid or spin. The proper direction of travel of the vehicle must be maintained by steering corrections, and due to the fact that cars are often driven at high rates of speed and by not too skillful drivers, a great many traffic accidents result because the steering corrections are not properly made or are not made quickly enough.

Stabilized vehicles according to this invention are stable with respect to rotation about a vertical axis, and during disturbances automatically set up compensating forces which tend to return them to their original position. In this manner, only gradual or very minor compensations in steering are necessary. The movements of the vehicle under disturbances and corrections are almost imperceptible, and specific quick reactions of the driver are not required in order to maintain the vehicle on its course or to prevent the vehicle from spinning dangerously should, for any reason, a condition of skid be initiated.

Preferably, a front wheel drive is employed, and this leads to even safer driving and permits curves to be negotiated more rapidly than can be done with an unstable vehicle.

It will be understood that this invention is susceptible to modification in order to adapt it to different usages and conditions, and, accordingly, it is desired to comprehend such modifications within this invention as may fall within the scope of the appended claims.

I claim:

1. A method of stabilizing an automotive vehicle which has its center of gravity located between the midpoint of the vehicle and the front axle thereof and which is subjected to destabilizing air flow forces and to the influence of lateral tire guidance forces corresponding to the tire load of said vehicle, which includes the step of directing said destabilizing air flow forces to impinge upon surfaces at the rear of the vehicle, the step of locating the point of attack of the resultant of said air flow forces between said midpoint and said center of gravity to create a moment about said center of gravity, and the step of distributing the load on said tires so that the point of attack of the resultant of said lateral tire guidance forces is likewise located between said midpoint and said center of gravity to create a moment adapted to counteract said first mentioned moment.

2. A method of stabilizing an automotive vehicle which has its center of gravity located between the midpoint of the vehicle and the front axle thereof and which is subjected to destabilizing air flow forces and to the influence of lateral tire guidance forces corresponding to the tire load of said vehicle, which includes the step of directing said destabilizing air flow forces to impinge upon surfaces at the rear of the vehicle, the step of locating the point of attack of the resultant of said air flow forces between said midpoint and said center of gravity to create a moment about said center of gravity, and the step of distributing the load on said tires so that the point of attack of the resultant of said lateral tire guidance forces substantially coincides with the point of attack of the resultant of said air flow forces to thereby create a moment about said center of gravity for counteracting said first mentioned moment.

WUNIBALD I. E. KAMM.

References Cited in the file of this patent

UNITED STATES PATENTS

| Number | Name | Date |
|---|---|---|
| 1,266,191 | Adsit | May 14, 1918 |
| 1,805,053 | Snell | May 12, 1931 |
| 1,868,382 | Coadon | July 19, 1932 |
| 1,903,694 | Burney | Apr. 11, 1933 |
| 1,954,528 | Hunt | Apr. 10, 1934 |
| 2,036,560 | Backus | Apr. 7, 1936 |
| 2,046,042 | Turner | June 30, 1936 |
| 2,126,589 | Turner | Aug. 9, 1938 |
| 2,128,686 | Andreau | Aug. 30, 1938 |
| 2,128,687 | Andreau | Aug. 30, 1938 |
| 2,247,742 | Best | July 1, 1941 |
| 2,254,287 | Heftler | Sept. 2, 1941 |
| 2,254,491 | Olley | Sept. 2, 1941 |
| 2,284,988 | Reid | June 2, 1942 |
| 2,350,353 | Heftler | June 6, 1944 |
| 2,353,266 | Reid | July 11, 1944 |

FOREIGN PATENTS

| Number | Country | Date |
|---|---|---|
| 97,186 | Switzerland | Dec. 16, 1922 |
| 691,520 | Germany | May 29, 1940 |
| 705,635 | Germany | May 5, 1941 |
| 887,384 | France | Aug. 9, 1943 |